Sept. 14, 1926.  
F. O. BALL  
CARBURETOR  
Original Filed June 10, 1919
1,599,865
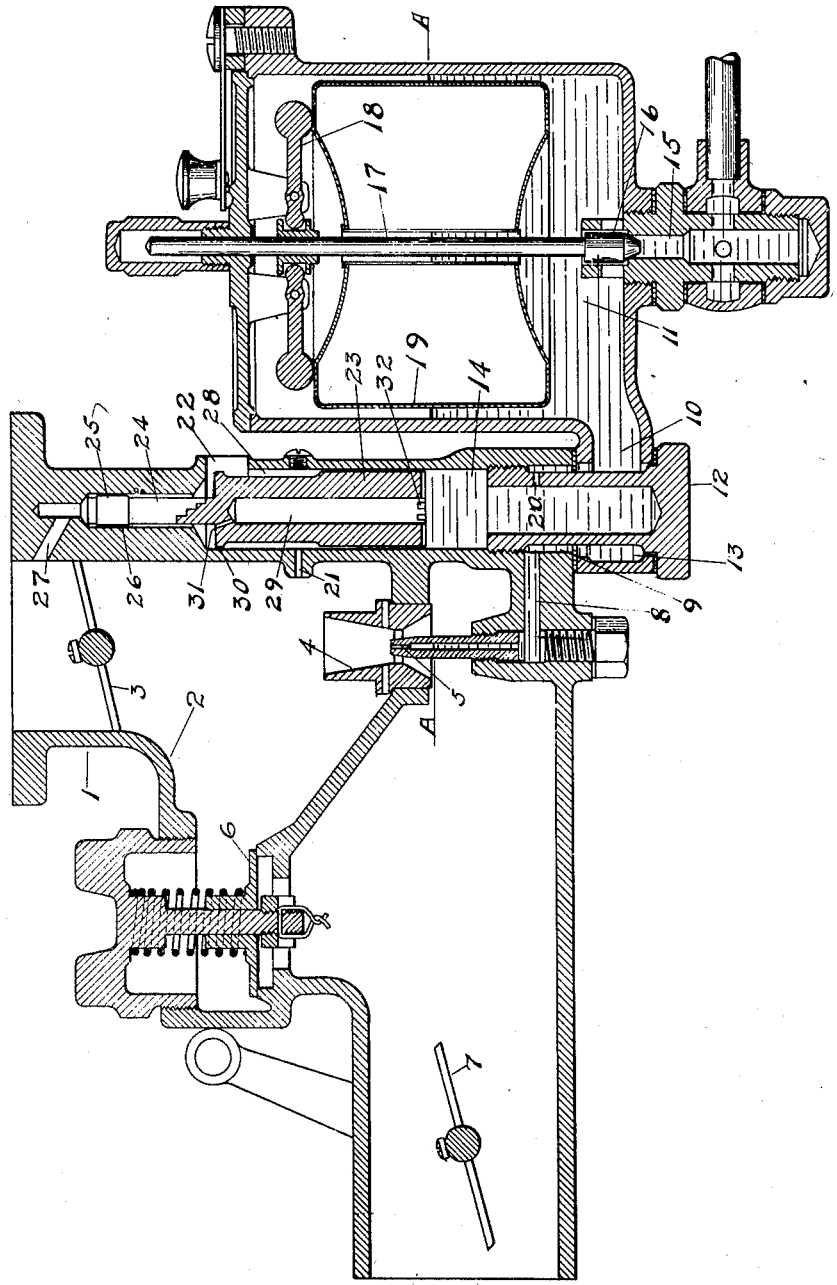
Inventor  
Frederick O Ball  
By  
Attorney Patented Sept. 14, 1926.

1,599,865

UNITED STATES PATENT OFFICE.

FREDERICK O. BALL, OF DETROIT, MICHIGAN, ASSIGNOR TO BALL & BALL CARBURETOR COMPANY, OF DETROIT, MICHIGAN, A PARTNERSHIP COMPOSED OF FREDERICK O. BALL AND CORNELIA M. BALL.

CARBURETOR.

Application filed June 10, 1919, Serial No. 303,208. Renewed February 23, 1923.

Carburetors ordinarily atomize the fuel through the action of the air. The atomizing is much more perfect with a high velocity of air than with a low velocity of air. Where the fuel is completely atomized practically all the fuel is effectively utilized in the working of the engine. When some of it is not atomized it is not so utilized and consequently the mixture must be enriched to compensate for this loss. Further it is desirable to momentarily supplement the normal mixture with a sudden change of velocity of air through the carburetor to bridge over the disturbance caused by this. This is usually effected by what is termed "a pick-up device". The present invention has to do with supplementing or enriching the fuel when there is a low velocity of air through the carburetor and also with relation to momentarily enriching the mixture where there is a sudden change in the air velocity.

The invention is illustrated in the accompanying drawings which show a vertical central section through a carburetor.

1 marks the body of the carburetor, 2 a suction passage, 3 the throttle valve, 4 the Venturi tube forming a primary air passage, 5 a fuel nozzle arranged in the Venturi tube, 6 an air valve opening to supply additional air in the initial operation of the carburetor through the Venturi tube and 7 a choke valve operating in the well known manner.

The nozzle is supplied from a passage 8 which communicates with an annular passage 9. The annular passage 9 communicates with a passage 10 arranged in an extension 13 and extending from a float chamber 11. A screw 12 passes through the extension 13 and into an opening or well 14 in the body of the carburetor, the screw forming a closure for the upper end of the annular passage 9 and for securing the float chamber to the body of the carburetor the usual gaskets being provided for the joints at the top and bottom of the extension.

The float chamber has the usual mechanism. Fuel is delivered to the float chamber through a passage 15. This passage is controlled by a valve 16. The valve has a stem 17. Levers 18 operate on the stem and communicate the movement of the float 19 to the valve.

A passage 20 permits a movement of the fuel from the passage 9 to the well 14. The well 14 is connected with the suction passage 2 by a passage 21 and communicates with the atmosphere at the upper end of the well through a passage 22. A plunger 23 is arranged in the well. The plunger has an extension 24 which terminates in a piston 25, the piston being arranged in a cylinder 26 in the body of the carburetor and the cylinder communicates at its upper end with the suction passage above the throttle through a passage 27.

When there is a pronounced reduction in pressure in the suction passage due to a high velocity of the motor under which conditions the restriction at the Venturi tube or at the valve 6 creates such suction or where such reduction in pressure is incident to a partial closure of the throttle valve this reduction in pressure is communicated to the cylinder 26 and acting on the piston 25 creates such a preponderance of pressure below the piston which is subjected to pressure only slightly below atmosphere as to overcome the weight of the plunger and carry the plunger to the upper position as shown in the drawings. Under these conditions fuel accumulates in the well 14 to approximately the fuel level A—A of the float chamber. The opening 21 is of such proportion to the opening 22 so that there is very little reduction of pressure in the well below atmospheric pressure but this will vary the level in the well slightly.

When the velocity of air through the suction passage is low and consequently there is but a slight atomizing energy this is accompanied by less reduction in pressure than is present when there is a high velocity and consequently the preponderance of pressure below the piston 25 is not sufficient to maintain the plunger 23 in its upper position. Consequently the plunger drops to its lower position on the top of the screw 12. This dropping of the plunger displaces the fuel and raises its level both in an annular space 28 around the plunger and in the passage 29 within the plunger. The upper end of the plunger is provided with a lip 30 which forms a valve as it passes over the opening 22 so that with the plunger in its lower position direct communication between the opening 22 and the opening 21 is closed. Air passes to the passage 29 through a metered opening 31 and this delivers practically atmospheric pressure for the moment above the column in the passage 29 and inasmuch as the communication with the opening 22 is closed the well is subjected to suction passage pressure through the opening 21. In consequence there is an immediate discharge of fuel through the opening 21. If it is desired to spray the fuel the valve 30 may be made of so loose a fit as to permit some leakage of air past it so as to be introduced with the fuel through the opening 21. After the momentary discharge of the accumulated fuel the well remains under the reduced pressure of the suction passage and consequently there is a constant indrawing of air through the opening 31 and passage 29 which passing around the lower side of the plunger picks up the fuel as it rises in the well and sprays it through the annular passage formed around the outside of the plunger and through the opening 21. In order to prevent a complete closure at the bottom of the plunger the plunger is ribbed at 32 forming radial openings for the passage of air and fuel. It will be seen, therefore, that with the plunger moving to its lower position there is a momentary discharge of accumulated fuel acting as a pick-up and this is followed by a supplemental supply of fuel so long as the low velocity continues through the suction passage. In this way the lack of atomizing energy is compensated for and in addition, if desired, the fuel may be further enriched than under ordinary high speed running and this is usually desirable.

What I claim as new is:—

1. In a carburetor, the combination of a suction passage; means for supplying air and fuel to the passage; a well communicating with a source of fuel supply, the suction passage and the atmosphere; a plunger in the well having an air conduit therethrough; and means responsive to changes of pressure in the suction passage actuating the plunger in the well.

2. In a carburetor, the combination of a suction passage; means for supplying air and fuel to the passage; a well in which fuel accumulates communicating with a source of fuel supply, the suction passage and the atmosphere; a plunger in the well having an air conduit therethrough; and means responsive to changes of pressure in the suction passage for actuating the plunger to displace the accumulated liquid to effect a momentary discharge from the well to the suction passage through the action of air delivered through the conduit.

3. In a carburetor, the combination of a suction passage; means for supplying air and fuel to the passage; a well communicating with a source of fuel supply, the suction passage and the atmosphere; a plunger in the well having an air conduit therethrough; and means responsive to changes of pressure in the suction passage actuating the plunger in the well to effect a supplemental supply of fuel to the suction passage through the action of air delivered through the conduit.

4. In a carburetor, the combination of a suction passage; means for supplying air and fuel to the passage; a well in which fuel accumulates communicating with a source of fuel supply, the suction passage and the atmosphere; a plunger in the well having an air conduit therethrough; and means responsive to changes of pressure in the suction passage for actuating the plunger to displace the accumulated liquid to effect a momentary discharge of the accumulated liquid to the suction passage and a continued discharge to the suction passage through the action of air delivered through the conduit.

5. In a carburetor, the combination of a suction passage; means for supplying air and fuel to the passage; a well communicating with a source of fuel supply, the suction passage and the atmosphere; a valve and a plunger, said valve operating on said atmospheric communication and the plunger operating in the well, having a movable air conduit, the level of the opening of which to the well is varied as the plunger is actuated; and means responsive to changes of pressure in the suction passage actuating the valve to discharge fuel from the well through the action of air delivered through the conduit.

6. In a carburetor, the combination of a suction passage; means for supplying air and fuel to the passage; a well communicating with a source of fuel supply, the suction passage and having a communication to the atmosphere; a plunger in the well having a conduit therethrough, said plunger carrying a valve operating on the communication to the atmosphere, said valve modifying the flow of air from said communication to said communication from the well to the suction passage as the plunger is actuated, the movement of the plunger changing the level of the opening of the conduit in the well; and means responsive to changes of pressure in the suction passage actuating the valve and plunger in the well.

7. In a carburetor, the combination of a suction passage; means for supplying air and fuel to the passage; a well communicating with a source of fuel supply having an auxiliary passage leading to the suction passage and a connection to the atmosphere; a plunger in the well adapted to displace fuel by its movement, said plunger having a valve adapted to open and close communication between said connection and said auxiliary passage as the plunger is operated and having a conduit therethrough, the level of the opening to the well being changed as the plunger is actuated whereby the fuel is carried out of the conduit and sprayed out of the well by the action of air in the conduit; and means responsive to changes of pressure in the suction passage actuating the plunger.

In testimony whereof I have hereunto set my hand.

FREDERICK O. BALL.